No. 611,269.  J. C. McLELAND.  Patented Sept. 27, 1898.
CALCULATING MACHINE.
(Application filed Sept. 19, 1896.)
(No Model.)  6 Sheets—Sheet 1.
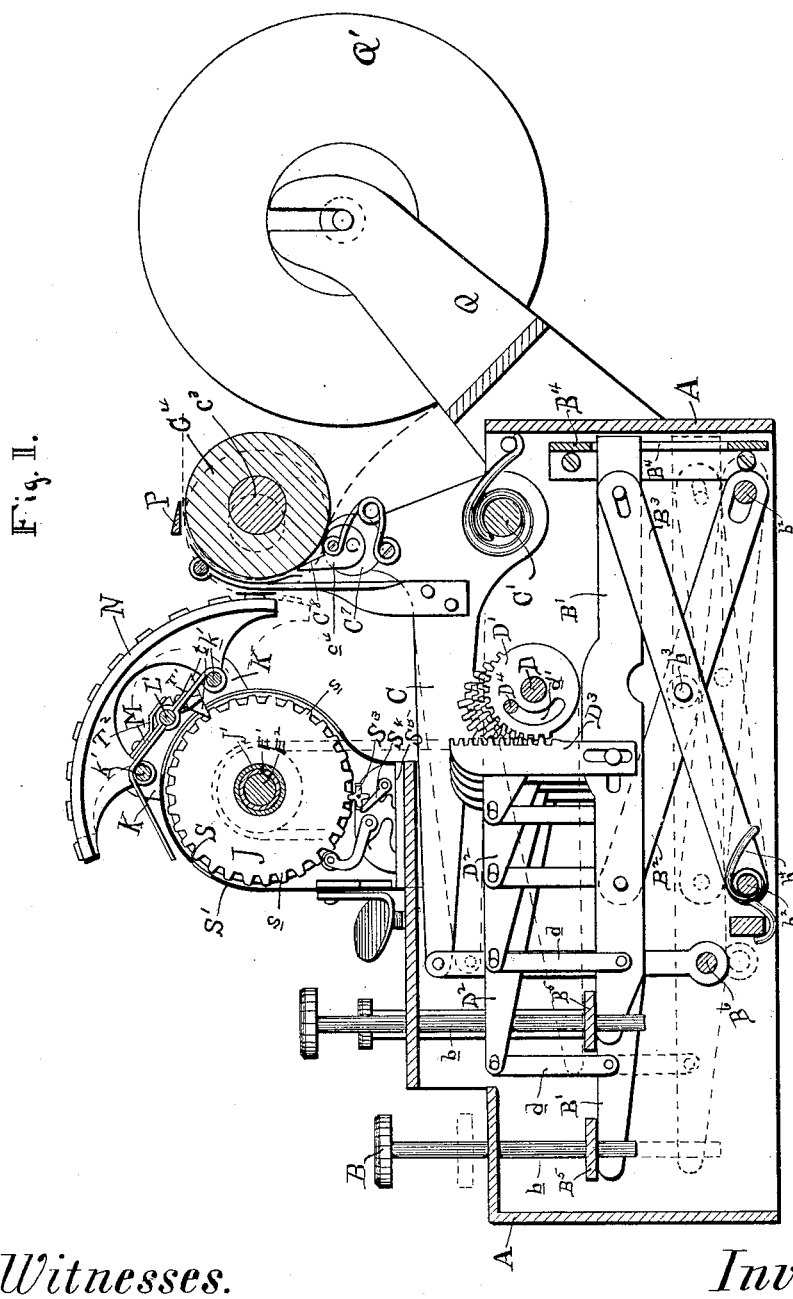
Fig. II.
Witnesses.
David T. Davies
N. E. Merkel
Inventor.
J. C. McLeland
per Hall & Fay
Attorneys.

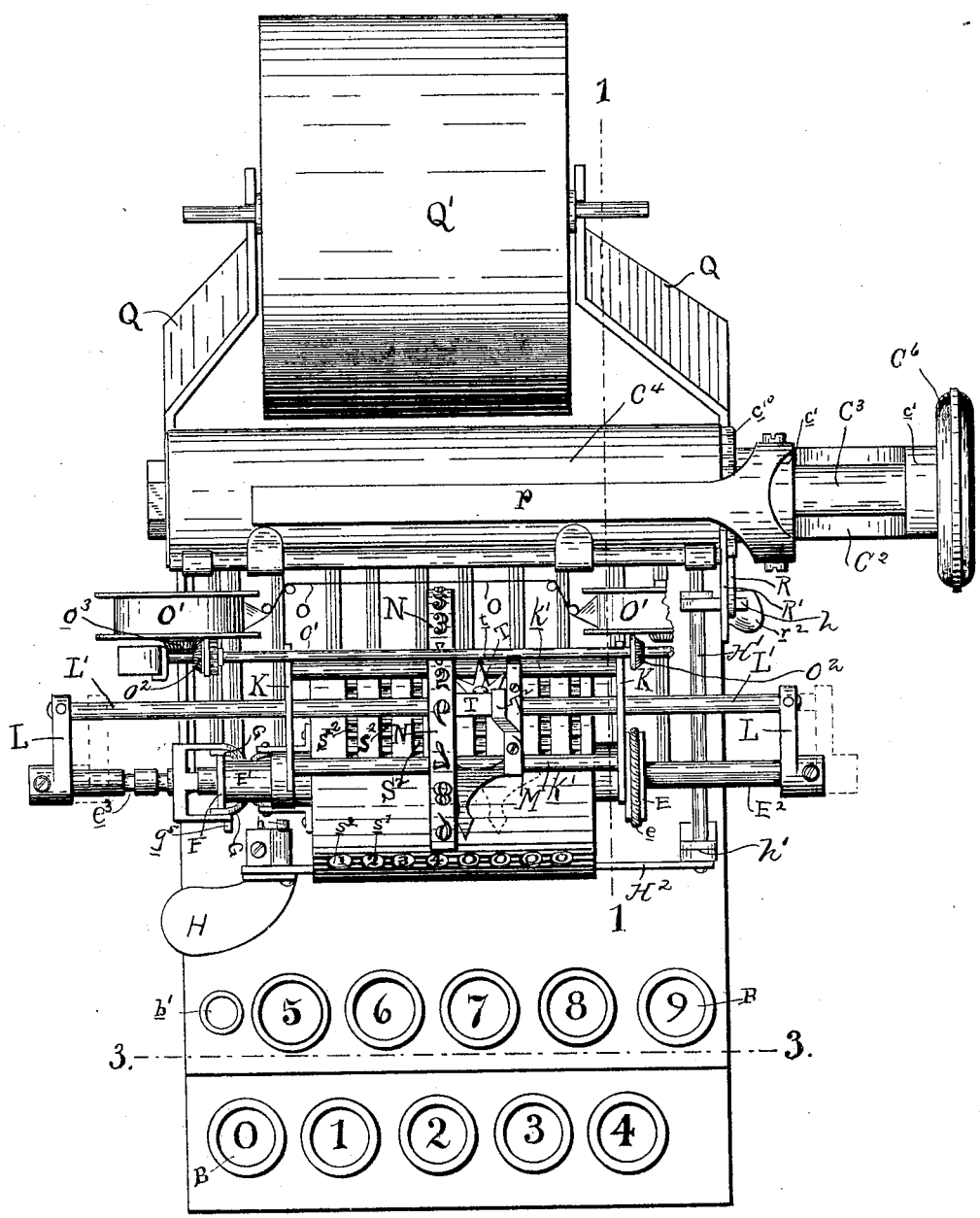

No. 611,269. Patented Sept. 27, 1898.
J. C. McLELAND.
CALCULATING MACHINE.
(Application filed Sept. 19, 1896.)
(No Model.) 6 Sheets—Sheet 3.
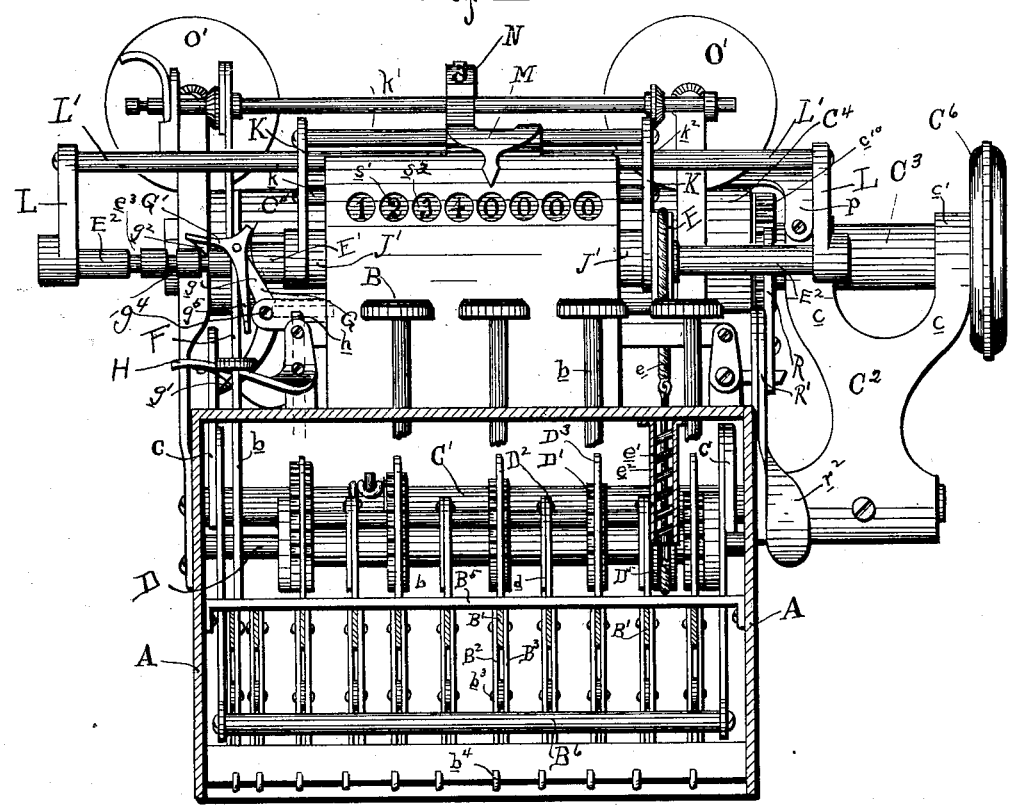
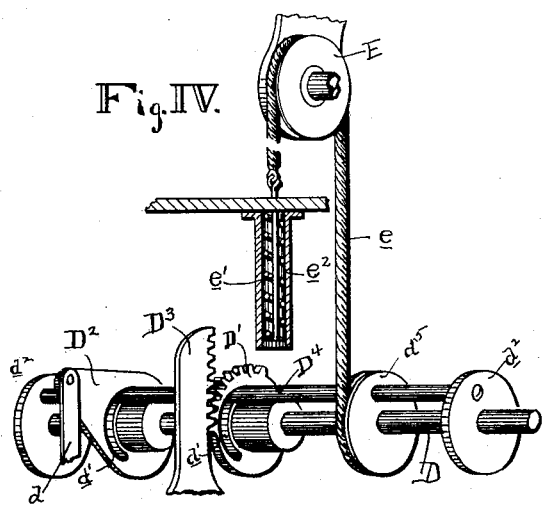
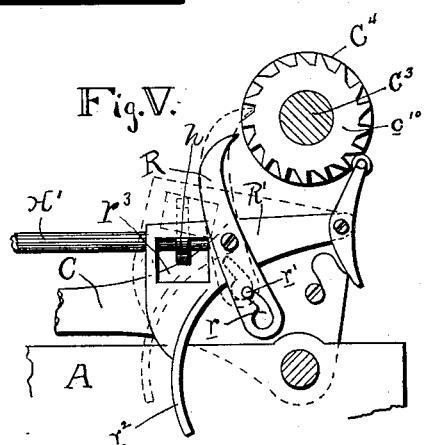
Witnesses.
David T. Davies
N. C. Merkel
Inventor.
J. C. McLeland
per Hall & Fay
Attorneys.

No. 611,269. Patented Sept. 27, 1898.
J. C. McLELAND.
CALCULATING MACHINE.
(Application filed Sept. 19, 1896.)
(No Model.) 6 Sheets—Sheet 4.
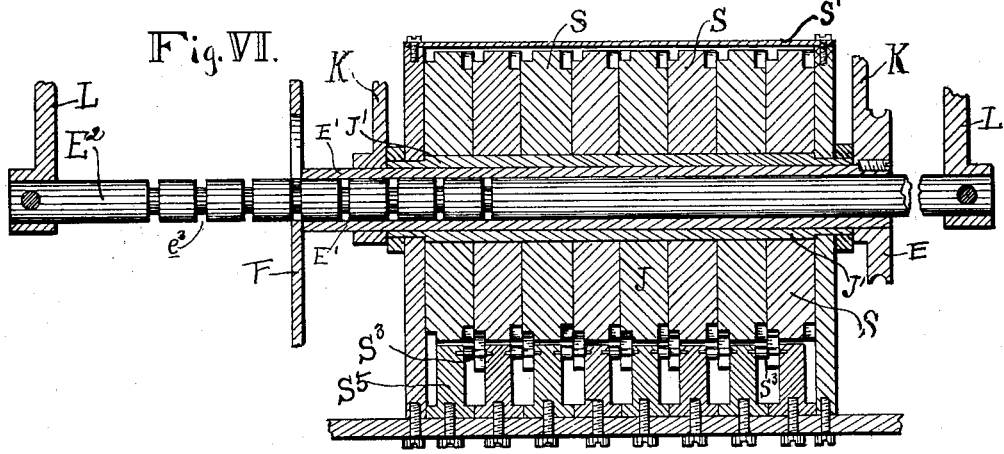
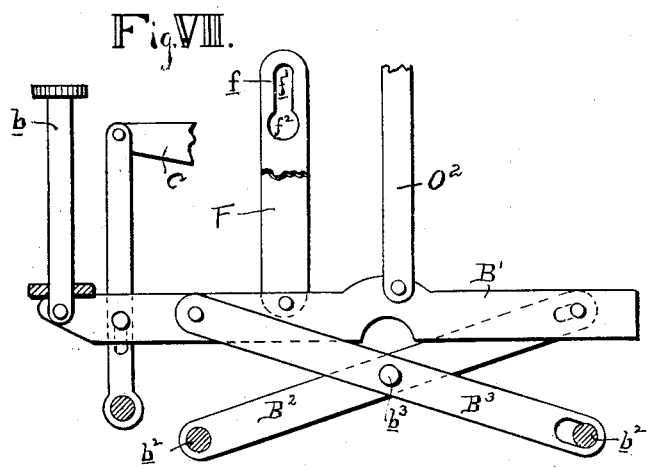
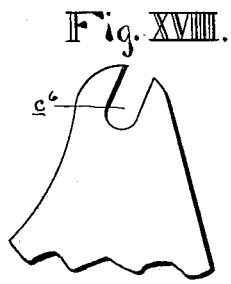
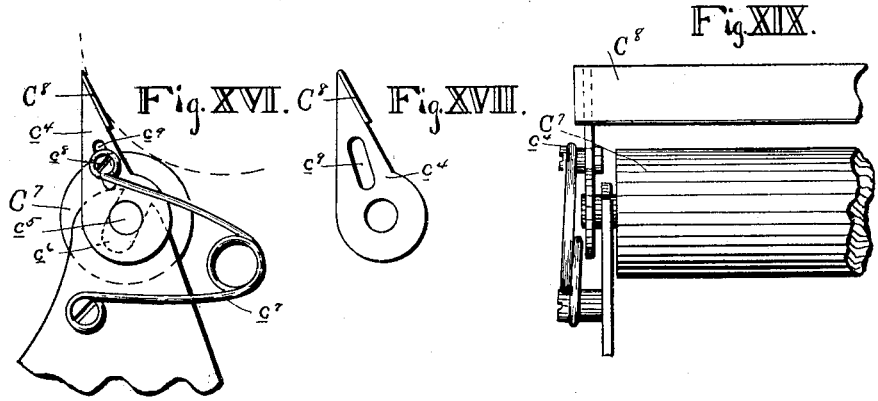
Witnesses.
David D. Davies
N. E. Merkel
Inventor.
J. C. McLeland
per Hall & Fay
Attorneys No. 611,269. Patented Sept. 27, 1898.
J. C. McLELAND.
CALCULATING MACHINE.
(Application filed Sept. 19, 1896.)
(No Model.) 6 Sheets—Sheet 5.
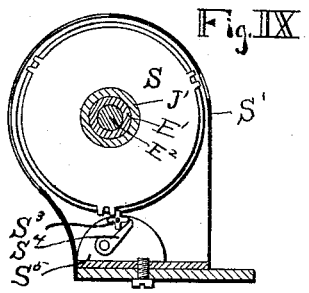
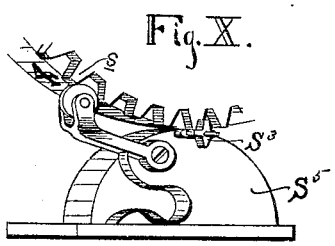
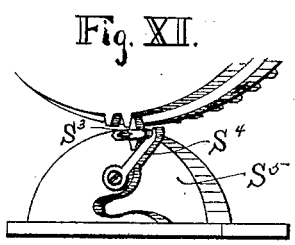
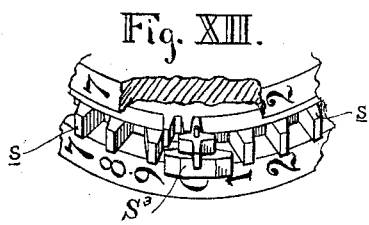
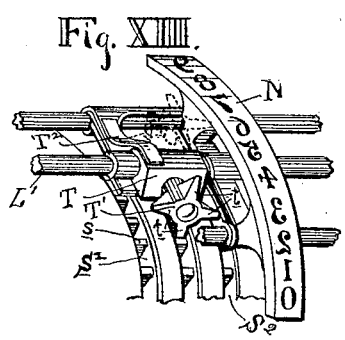
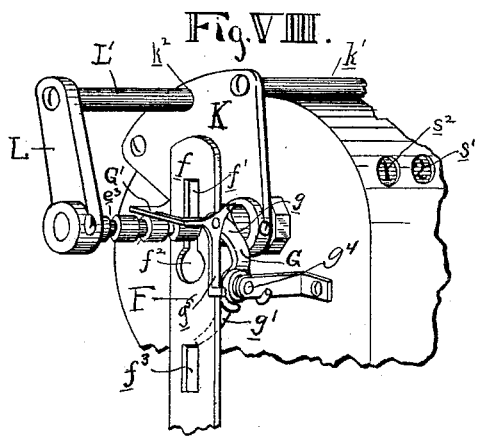
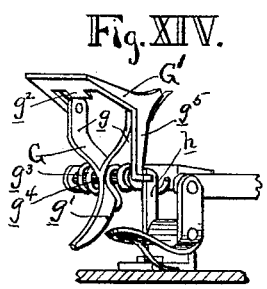
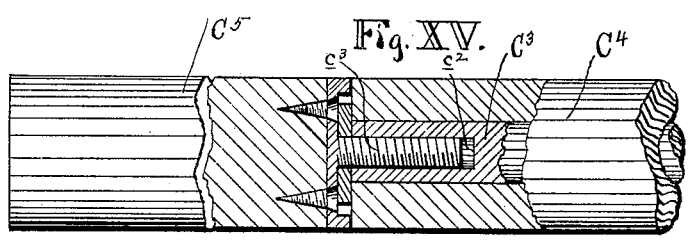
Witnesses.
David D. Davies
N. E. Merkel
Inventor.
J. C. McLeland
per Hall & Fay
Attorneys.

No. 611,269. Patented Sept. 27, 1898.
J. C. McLELAND.
CALCULATING MACHINE.
(Application filed Sept. 19, 1896.)
(No Model.) 6 Sheets—Sheet 6.
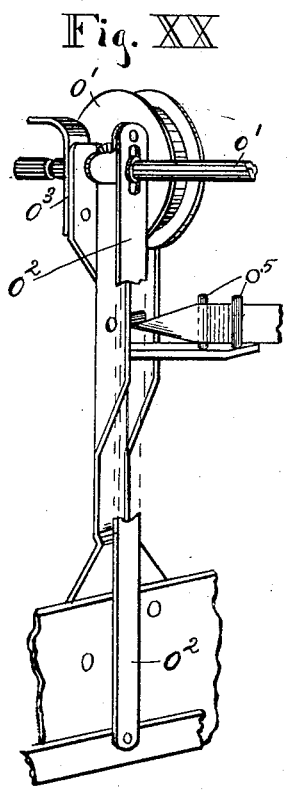
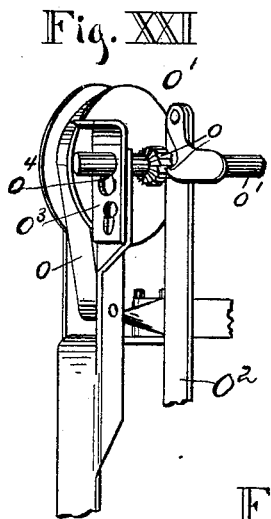
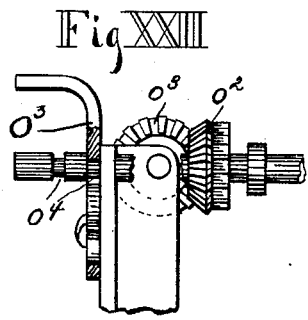
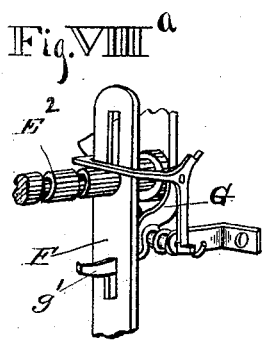
Witnesses.
W. E. Merkel
D. T. Davies
Inventor.
J. C. McLeland
per
Hall & Fay
Attorneys.

UNITED STATES PATENT OFFICE.

JOHN C. McLELAND, OF BUFFALO, NEW YORK.

CALCULATING-MACHINE.

SPECIFICATION forming part of Letters Patent No. 611,269, dated September 27, 1898.

Application filed September 19, 1896. Serial No. 606,384. (No model.)

*To all whom it may concern:*

Be it known that I, JOHN C. MCLELAND, a citizen of the United States, residing at Buffalo, in the county of Erie and State of New York, have invented certain new and useful Improvements in Computing and Recording Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The annexed drawings and the following description set forth in detail certain mechanism embodying the invention, such disclosed means constituting but one of various mechanical forms in which the principle of the invention may be used.

In said annexed drawings, Figure I represents a vertical longitudinal cross-sectional view of my improved computing and recording machine, taken upon the line 1 1 in Fig. II. Fig. II represents a top plan view of the entire machine. Fig. III represents a sectional view taken on the line 3 3 in Fig. II. Fig. IV represents a perspective view of a portion of the mechanism which operates the actuating means which actuates the recording mechanism and forms part of the type-actuating means, one complete combination of one of a plurality of said actuating means being also shown. Fig. V represents a side elevation of the platen-actuating means. Fig. VI represents a vertical central longitudinal cross-sectional view of the computing-disks, showing the type-carriage shaft located therein in elevation. Fig. VII represents a side elevation of the spacing-key and operating-bar, illustrating the general construction of each of the operating-bars and showing the particular connection whereby one of the bars is adapted to control the longitudinally-reciprocating carriage-actuating means. Fig. VIII represents a perspective view of one end of the housing inclosing the computing-disks, showing also one end of the type-carriage and the carriage-shaft-actuating means. Fig. VIII$^a$ represents a similar view of the carriage-shaft-actuating means, showing the interrupting means and the said actuating means in their normal positions. Fig. IX represents a vertical transverse cross-section of the housing surrounding the computing-disks, said section being taken upon a plane between two contiguous disks, one of which is shown in plan view in said figure, together with the means whereby said disks are rendered interdependent. Figs. X and XI represent perspective views of opposite sides of the lower portion of one of the disks, showing in addition the means whereby contiguous disks are made rotatively dependent upon each other. Fig. XII represents a perspective view of a portion of two contiguous disks. Fig. XIII represents a perspective view of the type-segment, a portion of its carriage, and the engaging dog, showing also a portion of the disk-housing and contained disks in the vicinity of said dog and carriage. Fig. XIV represents a perspective view of the carriage-shaft-actuating means and a portion of the platen-operating means. Fig. XV represents a partial cross-section of the platen. Fig. XVI represents an end elevation of the pressure roller and plate. Fig. XVII represents an elevational view of the presser-plate arm, and Fig. XVIII a similar view of the presser-roller support and bearing. Fig. XIX represents a front view of one end of the said roller and plate. Fig. XX represents a perspective view of one portion of the ribbon-feeding device, showing the means which connect the said device with the operating mechanism of the machine. Fig. XXI represents another perspective view of the same portion of the ribbon-feeding mechanism, and Fig. XXII is a detail elevation of a portion of said mechanism.

The mechanism constituting my improved machine is mounted in a suitable housing A and consists generally of operating means, recording mechanism, and computing mechanism. The recording mechanism consists of printing means and type-actuating means. These various mechanisms and means are so connected and arranged, as will hereinafter be fully described, that all may be operated simultaneously or concomitantly by a common operating means.

I will now describe successively the operating means, type-actuating means, printing means, and computing mechanism.

*Operating means.*—The operating means consists of ten keys B, each bearing one of the numbers from "0" to "9," inclusive, and suitably mounted upon operating-bars B', each of said keys connected to the end of one of said bars by a suitable key-stem $b$, which projects upwardly through the housing A, and a blank or spacing bar and key $b'$. Each of said bars B' and bar $b'$ is mounted at the upper ends of two cross-levers $B^2$ and $B^3$ of equal length and journaled at their lower ends on transverse rods $b^2$, extending across and rigidly attached to the frame of the machine. The said rods are so placed that the bars B' are normally held in a horizontal position or parallel with the base of the machine. A suitable pin $b^3$ rotatably fastens the two levers at their crossing-point. Two of the journal-bearings in the ends of said levers are elongated, as shown in Fig. VII, the two right-hand journal-bearings being so elongated. This construction permits the said ends to move outwardly on the depression of the key, the two cross-levers being pinned at their crossing-point. Such depression of the key and consequent operation of the cross-levers carries the bar B' downwardly in a manner such that the initial position of the cross-bar is parallel with its final position—that is, every point in said bar is depressed an equal distance, so that the same amount of motion may be taken from one point as any other point thereof. By these means the same amount of motion may be taken from any part of the said bars B'. Suitable springs $b^4$ are provided to normally maintain each bar in its uppermost position, which position is determined at one end by a transverse slotted stop-plate $B^4$, through which the right-hand ends of the bars project, and by the transversely-mounted stop-bars $B^5$, disposed in a manner such that they will jointly maintain the left-hand ends at a height equal to that in which the right-hand ends are held.

Extending transversely across the frame of the machine is a platen-operating rod $B^6$, so disposed that each of the operating-bars B' and bar $b'$ will engage said transverse bar near the end of their several strokes. The ends of said operating-bars are secured to two platen-operating levers C, one on the inside of each side of the machine and placed longitudinally of the frame. The right-hand end of each of said levers C is secured to a platen-operating rock-shaft C', to which is secured, in a manner which will be hereinafter fully described, the platen, which platen by these means may be oscillated by the operation of the keys and operating-bars to retract with respect to the type.

*Type-actuating means.*—The type-actuating means are operated from the operating-bars and consist of a line of type in a direction along the axis on which the type are rotatively mounted and means adapted to rotate said type in the direction of said line. A type-operating shaft D is transversely secured to the frame of the machine above the operating-bars and has journaled thereon five independent segmental gears D' and four independent operating-levers $D^2$. Each of the segmental gears is engaged by a vertical rack $D^3$, pivoted upon an operating-bar connected with one of the numbered keys in the row nearest the right-hand end of the machine. The ends of the levers are suitably connected by means of connecting-rods $d$ to the remaining operating-bars, which are connected with the remainder of the numbered keys. The keys are so arranged that the segmental gears will alternate on the shaft with the levers. Each segmental gear and each lever is formed with a slot $d'$, cut in the arc of equal circles whose centers are each pierced by the axis of the shaft. An operating-rod $D^4$ passes through each slot and is secured at each end to a lever or pulley $d^2$, journaled upon the operating-shaft. The said operating-rod is further secured to an operating-pulley $d^5$, also journaled upon the same shaft. A second operating-pulley E is secured to the type-carriage arbor E', operatively and rotatively connected with a carriage-shaft $E^2$ and is located in the same vertical plane. One end of a cord $e$, secured to the periphery of pulley $d^5$, passes around said pulley and over pulley E, from whence it descends and is attached to a spring $e'$, secured to the inside of a barrel $e^2$. An elastic and flexible connection is thus formed between the two pulleys. The action of the spring $e'$ causes the operating-rod $D^4$ to normally rest against the upper portion of the slots $d'$, as is shown in Fig. IV.

By the above-described means it is seen that each segmental gear and each operating-lever may be independently operated by its respective key to rotate the pulley $d^5$ and through it the pulley E and the carriage-shaft $E^2$. I prefer to use alternately segmental gears and levers, although, as may be readily understood, either might be used exclusively of the other. The type, which are operatively connected with said shaft $E^2$ in a manner to be hereinafter fully described, are by the above means given a rotary movement along the line of the type in a manner also to be further described. In addition to having imparted to it by the operation of the keys and the intermediate mechanism a rotary motion the said shaft $E^2$ is also given by said operation an intermittent longitudinal movement, the means for accomplishing which movement I will now describe.

Attached to the operating and spacing bar $b'$ is an interrupting-bar F, Fig. VIII, which extends upwardly and embraces, by means of a slotted end portion $f$, the carriage-shaft $E^2$. The said bar $b'$ and key are preferably located at the extreme left of one of the two rows of numbered keys and, unlike the numbered keys, is not connected with the operating-pulleys, so that when it alone is operated the said pulleys, and consequently the shaft $E^2$, remain immovable. The shaft $E^2$ is formed in a portion of its length with reduced portions, forming grooves $e^3$, Fig. VI. The slot $f'$ in the slotted end $f$ of the bar F is of a width such that the reduced portions of the shaft may easily slide therein. Intersecting the lower part of said slot is a circular hole $f^2$ of a diameter of the shaft $E^2$, so that said shaft may be caused to slide therethrough. The interrupting-bar F is normally held so that the hole $f^2$ and shaft $E^2$ are concentric, (see Fig. VIII$^a$,) the length of the bar being so arranged that the stop-plate $B^4$ and stop-bars $B^5$ cause it to normally assume that position. It will be noted, then, that when the said interrupting-bar is in its uppermost or normal position the shaft $E^2$ may be longitudinally moved through the slotted end of said bar, but when the spacing-key is depressed such movement is prevented.

Journaled to the frame of the machine and in the vicinity of shaft $E^2$ is a Y-shaped lever G, whose two upper arms $g$ extend one on each side of said shaft. (See Fig. XIV.) The lower arm $g'$ extends downwardly and outwardly into a slot $f^3$ in the interrupting-bar F, located beneath the slot $f'$ and hole $f^2$. Pivoted at the upper extremities of the lever G is a pawl G', having an engaging portion $g^2$, adapted to engage the shaft $E^2$ in the annular grooves $e^3$, formed by the reduced portions of said shaft. A spring $g^3$ is suitably attached to the small shaft $g^4$, on which the shifting lever is journaled and engages the said lever to throw the lower arm $g'$ into said slot $f^3$.

The shifting mechanism operates as follows: The Y-shaped shifting lever G is normally held by the spring $g^3$, so that its upper arms, and consequently the pawl G, is in a position as far to the right as the contact of the lower arm $g'$ with the slot in the interrupting-bar F will allow. On the depression of the spacing-key and the interrupting-bar the contact of the upper extremity of the slot $f^3$ throws the lever G, and consequently the pawl G', over to the left until the said pawl engages the next groove, the shaft $E^2$ being meanwhile held in a stationary position by the interrupting-bar. On the bar being released to assume its normal position the shifting lever, with the engaging pawl, which, as before mentioned, has meanwhile engaged the shaft $E^2$ in the next groove $e^3$ to the left, is actuated in the opposite direction by said spring $g^3$, whereby the carriage-shaft is moved to the right a distance equal to that between two successive grooves $e^3$, the interrupting-bar preventing the displacement of the shaft, as before described, while the shifting lever is being moved to the left. Pivoted to the frame of the machine and near said pawl is a releasing-lever H, provided with an upwardly-extending arm $h$, which engages, on the depression of said lever H, an arm $g^5$, attached to or integral with said pawl, whereby the latter may be raised independently of the interrupting-bar and the said shaft shifted from right to left by hand. The platen-operating rod is suitably connected with the spacing-bar $b'$, whereby the depression of any one of the numbered keys will control the longitudinally-actuating means. It is thus seen that each operation of one of the numbered keys or of the spacing-key causes the shaft E to advance a distance from left to right equal to that between two successive grooves on said shaft. The said distance between two successive grooves is made such that the distance which the shaft is shifted is equal to that distance which is required to shift a type to point two digits in successive orders in a number.

I will now describe the manner in which and means by which the line of type is rotated. The shaft $E^2$ is, as above described, rotatively and slidably mounted, its bearing being formed by the arbor E', journaled in a sleeve J', which forms a bearing for the computing mechanism J. Two guide-arms K are secured to the arbor E', one at each end of the sleeve J', the pulley E being preferably made integral with or secured to one of said arms, as is shown in Fig. VI. Suitable washers or nuts are interposed between the ends of the sleeve J', whereby the endwise displacement of the said arms and arbor is prevented. The free end of each arm is formed with two branches, of which the opposite ones in each arm are joined by a rod $k'$, rigidly affixed thereto. These two rods, extending transversely of the machine, are hence rotatable upon the axis of the arbor, but not longitudinally movable. At each end of the shaft $E^2$, which extends some distance beyond each end of the arbor E', is secured a carriage-arm L, between which two arms extends a carriage-rod L', which passes through a bore $k^2$ formed in each guide-arm K, the bores being of such size that the rod L' may be easily slid through them. Secured to said carriage-rod and located between the two guide-arms K is a type-carriage M, to which is secured a type-segment N. The said segment forms a portion of an annular cylindrical section included between two parallel planes perpendicular to the cylinder's axis, the axis of the said cylinder coinciding with the axes of the shaft $E^2$, arbor E', and sleeve J'. Suitably secured to the outer surface of the type-segment is a row of type forming a line of figures from "0" to "9," inclusive, the said line lying in a plane perpendicular to the axis of the shaft $E^2$. The said line of type may be thus rotated in said plane, and by the intermittent advancing of shaft $E^2$ the carriage-rod, carriage, and type may be, as before described, advanced a distance from left to right required to print digits in successive orders of a number by each operation of the operating-keys, the platen carrying the paper to be used being at the proper time retracted to and from the said type, whereby the printing operation is effected, which operation will be further more fully described. At this point it will be noted that it is necessary to bring the particular type corresponding to the particular key depressed to the same point in the oscillation of the type-segment relatively to the platen—that is, each type must be successively brought upon the same imaginary line parallel to the axis of rotation and in the portion of cylindrical surface described by the successive oscillations of the type. To accomplish this object, each numbered key and the intermediate operating mechanism is arranged to oscillate the segment in an arc of different length than that of any of the others. This is effected by varying the length of the operating-lever $D^2$ and the diameter of the operating segmental gears D, as shown in Fig. I, and arranging the location of the corresponding connecting rods and racks on the several operating-bars, which, as is readily understood, causes a variation of the arc of oscillation of the pulley $D^4$, and consequently of the type themselves.

*Printing means.*—The platen-operating levers C are, as before described, secured to the platen-operating rock-shaft C', said shaft being suitably journaled in the frame of the machine. One end of the shaft projects some distance beyond the machine-frame and has secured thereto a rocking arm $C^2$, formed at its upper end with two branches or arms c, on whose upper ends are formed or provided the journal-bearings c' for the platen-shaft $C^3$. The platen $C^4$ is secured to the said shaft in a suitable manner and extends laterally from said bearings, the opposite end of the shaft being free and unsupported, whereby a sheet of paper, as is readily seen, may be easily slipped upon the platen. The free end of the shaft $C^3$ is formed with a threaded bore $c^2$, into which may be screwed a bolt or screw $c^3$, which is fastened axially to an auxiliary platen $C^5$, which may be thereby secured to the platen $C^4$, if so desired, in order to accommodate larger sheets of paper. The journal of the platen-shaft is provided with a hand-wheel $C^6$, by means of which the platen may be manually manipulated. A pressure-roller $C^7$ and pressure-plate $C^8$ are provided and suitably mounted on the platen-operating lever, which is formed with suitable arms or extension for that purpose. The plate-carrying arms $c^4$ are journaled upon the roller-spindle $c^5$, which is journaled in an open bearing $c^6$. A spring $c^7$, one of whose ends is secured to the operating-lever extension, is secured at its other to a screw $c^8$, which is adjustable in a slot $c^9$, formed on the carrying-arm $c^4$. This construction permits of proper equalization of pressure communicated by the spring to both roller and plate.

The platen $C^4$ is provided at one end with a ratchet-wheel $c^{10}$, Fig. V, which is engaged by a ratchet-dog R, mounted upon a plate R', suitably pivoted to the platen-operating lever C, whereby said platen always retains the same position relatively to the platen. The said ratchet is pivoted substantially near its middle, the lower portion thereof being formed with a slot r, through which projects a pin or stud r', secured to said plate. The lower portion of said plate is formed with a handpiece or lever $r^2$, by means of which the plate and ratchet may be raised on the pivot and the said ratchet-dog caused to engage the ratchet-wheel, and thus cause the partial rotation of the platen. The slot r is of cam formation, and by engaging the pin r' causes the dog to engage the ratchet-wheel $c^{10}$ when the plate R' is raised, whereby the said wheel, and consequently the platen, may be rotated a suitable distance on each such operation. On lowering the plate the pin operating in the slot throws the dog out of engagement with the ratchet-wheel. The weight of the plate is sufficient to cause it to drop by gravitation when released. The said plate is formed with a slot $r^3$, Fig. V, the upper extremity of which is engaged by contact by a lifting-pawl h, secured to a rock-shaft H', journaled longitudinally of the machine. The opposite extremity is provided with a crank-lever h', Fig. II, to which is journaled the end of a connecting-rod $H^2$, whose opposite extremity is journaled to the lever H, so that the depression of the latter will draw over the crank-lever, partially rotate the rock-shaft, cause the dog to lift the plate, and in the above-described manner partially rotate the platen. Suitably located between the type-segment and the platen is a ribbon O such as is used in ordinary type-writers, said ribbon being mounted upon two spools O' suitably located. A vertical connecting-rod $O^2$ is connected with a suitable pawl, which engages a ratchet-wheel o, secured to a shaft o', provided near its extremities with two bevel-gears $o^2$, each adapted to engage a second gear $o^3$, each of which latter is secured to one of the spindles carrying the spools O', Figs. II, XX, XXI, and XXII. The location of the bevel-gears $o^2$ is such that when one engages its corresponding gear on the adjacent spool the other is disengaged from its corresponding gear, so that only one of the said gears is operatively connected at the same time. A slotted plate $O^3$ is secured to a suitable standard and embraces the shaft o', which is formed with two grooves $o^4$, by means of the engagement of which grooves the slotted plate prevents the longitudinal displacement of said shaft. The lower portion of the slot in said plate, which embraces said shaft at the depressions, is formed with a bore of a diameter sufficient to permit the said shaft to pass therethrough, so that on raising said plate the said shaft may be longitudinally moved, so as to bring one or the other of said grooves into engagement with the narrow portion of said slot. By these means one or the other of said bevel-gears may be brought into engagement with its corresponding gear on the adjacent spool, whereby, as is readily seen, the ribbon may be fed in either one of its longitudinal directions by the reciprocation of the rod $O^2$ and the consequent engagement of the pawl with the ratchet-wheel $o$. Suitable pins $o^5$ are provided to properly guide the ribbon into its required position to receive the impressions of the type. A suitable paper-cutter P is also provided on the platen, whereby the paper may be severed, also arms Q, which carry a spool Q', containing the paper.

*Computing mechanism.*—The computing mechanism (shown in Figs. VI and IX to XII, inclusive) consists of a suitable number of interdependent computing-disks S and mounted upon the sleeve J', inclosed in a housing or cover S'. Each disk is formed on its periphery with a series of peripheral teeth $s$, which teeth are disposed opposite slots $S^2$, cut in the said housing. The peripheries of said disks are further provided with numbers $s'$, which are visible through apertures $s^2$ in the housing. Each disk is for convenience furnished with three sets of numbers ranging from "0" to "9" and each is operated by the one next below it referring to the orders of a number through the medium of a dog $S^3$, which is held in engagement with each two adjacent disks by a spring-pressed lever $S^4$, pivoted to a base $S^5$ in the lower part of the housing, the communication being established at the proper intervals, as is usual in such mechanism.

Pivoted on the carriage-rod L' is a computing-mechanism-operating block T, to which is journaled on a journal at right angles to said carriage-rod an operating-dog T', having a plurality of teeth $t$, adapted to engage the teeth in computing-disks. Said operating-teeth have a pitch substantially equal to the distance between the parallel planes passing through the centers of two adjoining disks, and during the longitudinal movement of the type-carriage said teeth are engaged by the sides of the slots in the housing, whereby said dog is rotated and caused to engage successively each disk to partially rotate it on each partial revolution of the type-carriage about the disks. The said block may be rotated a quarter-turn upon its axis to throw it out of engagement with the disks, in which position it is held by a spring $T^2$, or it may be rotated a half-turn when the disks are rotated in the opposite direction by the revolution of the carriage. It is thus seen that when the dog is reversed the computing-disks may, if one direction of rotation of the disks perform addition, be made to perform the operation of subtraction.

Each operation of the manipulating-key revolves the type-carriage about the computing-disks, the arc of revolution or oscillation being proportionate to the number, which motion is communicated accordingly to the computing-disks, the recording means at the same time recording said amount, as above described, on the paper sheet and computing successively recorded numbers on the computing-disks.

Other modes of applying the principle of my invention may be employed instead of the one explained, change being made as regards the mechanism herein disclosed, provided the means covered by any one of the following claims be employed.

I therefore particularly point out and distinctly claim as my invention—

1. In a computing and recording machine, recording mechanism consisting of the combination of operating means, type, a suitable type-support, means for carrying a sheet, said type-support and sheet-carrying means relatively retractable, means for shifting said type-support on each movement of the operating means a distance equal to that between two digits in successive orders of the number to be recorded and computing mechanism, substantially as set forth.

2. In a computing and recording machine, recording mechanism consisting of the combination of operating means, type, a single type-segment on which said type are mounted, means for carrying a sheet, said type-support and sheet-carrying means relatively retractable and means for shifting said type-segment on each operation of the operating means a distance equal to that required to print the number in the next lower order of the number to be recorded, substantially as set forth.

3. In a computing and recording machine, recording mechanism consisting of the combination of operating means, a single type segment or carrier having a line of type-numbers arranged thereon, means for carrying a sheet, said type-segment and sheet-carrying means relatively retractable, said operating means capable of moving said segment in the direction of the said line of type and also a distance equal to that required to print the digit in the next lower order in the number to be recorded, substantially as set forth.

4. In a computing and recording machine, the combination of a plurality of operating keys and mechanisms, a series of type mounted upon a carriage capable of having a longitudinal and a transverse movement, said operating keys and mechanisms capable of imparting transverse movement to said type-carriage, and means for intermittently imparting said longitudinal movement to said carriage, substantially as set forth.

5. In a computing and recording machine, the combination of operating means, a series of type mounted upon a carriage, means for rotating said carriage about an axis and for intermittently advancing it in the direction of said axis, interdependent computing-disks, and means for actuating each disk successively from left to right on each operation of the operating means, substantially as set forth.

6. In a computing and recording machine, the combination of operating means, a plurality of interdependent computing-disks, a type-carriage having a rotary and a longitudinal motion and provided with means for engaging said disks, means for intermittently advancing said carriage from left to right and bringing said engaging means successively into operative communication with each disk, and means for actuating said carriage to have said rotary motion on each operation of the operating means, substantially as set forth.

7. In a computing and recording machine, the combination of operating means, a series of type mounted upon a carriage, means for rotating said carriage about an axis and for intermittently advancing it in the direction of said axis, and interdependent computing-disks, said carriage provided with means for actuating said computing means by engaging separately and successively from left to right said computing-disks, substantially as set forth.

8. In a computing and recording machine, the combination of operating means, a series of type mounted upon a carriage, means for rotating said carriage about an axis and for intermittently advancing it in the direction of said axis, and interdependent computing-disks, said carriage provided with a reversible dog for engaging and actuating said disks whereby said disks may be rotated in either of their two circumferential directions, substantially as set forth.

9. In a computing and recording machine, the combination of operating means, a series of type mounted upon a carriage, means for rotating said carriage about an axis and intermittently advancing it in the direction of said axis, and interdependent computing-disks, said carriage provided with a rotatable dog provided with a plurality of teeth having a pitch substantially equal to the distance from center to center of said disks, and capable of engaging and actuating said disks, substantially as set forth.

10. In a computing and recording machine, the combination of operating means, a plurality of interdependent computing-disks, a carriage, means for imparting to said carriage a rotary and a longitudinal motion, rotatable means for engaging said disks, means for intermittently advancing said carriage from left to right whereby said engaging means is successively brought into the vicinity of each disk, means for bringing said engaging means into operative communication with each disk, and means for actuating said carriage to have said rotary and longitudinal motion on each operation of the operating means, substantially as set forth.

11. In a computing and recording machine, the combination of operating means, a plurality of interdependent computing-disks, a carriage, means for imparting to said carriage a longitudinal and a rotary motion, a rotatable dog provided with a plurality of teeth adapted to engage said disks, said dog mounted upon an arbor on said carriage, substantially parallel with the axis of said disks, whereby said dog may be reversed, and means for rotating and advancing said carriage longitudinally from left to right on each operation of the operating means, substantially as set forth.

12. In a computing and recording machine, the combination with a series of interdependent computing-disks, of a type-carriage having an intermittently longitudinal and a revolving movement relatively to and in the vicinity of said disks, said carriage provided with means adapted to engage the peripheries of said disks, whereby said revolving motion may be communicated to said disks, said engaging means adapted to engage successively each of said disks from left to right on each intermittent longitudinal movement of the carriage, substantially as set forth.

13. In a computing and recording machine, the combination of a series of interdependent computing-disks, a carriage having a concomitant intermittent longitudinal and a revolving movement relatively to and in the vicinity of said disks, said carriage provided with a reversible dog adapted to successively engage said disks from left to right whereby said revolving motion may be successively communicated to said disks on each longitudinal and revolving movement of said carriage, substantially as set forth.

14. In a computing and recording machine, the combination of a series of computing-disks, a hollow sleeve forming the bearing for said disks and mounted in a suitable housing, a type-carriage, a hollow arbor journaled in said sleeve, a shaft mounted in said arbor, a guide adapted to guide said carriage and suitably secured to said arbor, and means adapted to rotate and reciprocate said shaft, said type-carriage being secured to said shaft, substantially as set forth.

15. In a computing and recording machine, the combination of a series of computing-disks, a sleeve forming the bearing for said disks, and mounted in a suitable housing, a shaft concentric with said sleeve, means for rotating and reciprocating said shaft, and a type-carriage secured to said shaft, substantially as set forth.

16. In a computing and recording machine, the combination of a sleeve secured to a suitable housing, a series of computing-disks mounted upon said sleeve, a hollow arbor journaled in said sleeve, a type-carriage, a carriage-guide secured to said arbor, a shaft rotatably and slidably mounted in said arbor, and means for reciprocating and rotating said shaft, said guide being operatively connected with said carriage, whereby said guide rotates with said carriage, substantially as set forth.

17. In a computing and recording machine, the combination of a shaft mounted in a suitable bearing and provided with projections, reciprocating means adapted to engage said projections to intermittently move said shaft in the direction of its axis, means for reciprocatively rotating said shaft, and operating means for actuating said reciprocating means and said rotating means, substantially as set forth.

18. In a computing and recording machine, the combination of a key-stem, cross-levers, and an operating-bar mounted upon said cross-levers, said levers adapted to move said bar, the initial and final positions of the latter being parallel with each other, substantially as set forth.

19. In a computing and recording machine, the combination of a key-stem, cross-levers, and an operating-bar mounted upon said cross-levers, the latter journaled to said bar and to a stationary part of the machine, said levers adapted to move said bar, the initial and final positions of the latter being parallel with each other, substantially as set forth.

20. In a computing and recording machine, the combination of a key-stem, an operating-bar, and two cross-levers, one extremity of each being journaled on said bar, the other extremities journaled upon a stationary part of the machine, substantially as set forth.

21. In a computing and recording machine, the combination of a key-stem, an operating-bar, and two cross-levers, one extremity of each lever journaled on said bar and the other extremities journaled upon the frame of the machine, one journal of each lever being elongated, substantially as set forth.

22. In a computing and recording machine, the combination of a key-stem, an operating-bar, and two cross-levers, one extremity of each lever journaled on said bar and the other extremities journaled upon the frame of the machine, each lever having one elongated journal, and both said levers pinned to each other at their crossing, substantially as set forth.

23. In a computing and recording machine, the combination of operating-bars, a shaft, levers mounted upon said shaft, each lever adapted to be actuated by one of said bars, and means for controlling the computing mechanism, said levers each adapted to actuate said controlling means, substantially as set forth.

24. In a computing and recording machine, the combination of operating-bars, a shaft, a rocking rod mounted upon said shaft, and means for controlling the computing mechanism, said rod adapted to actuate said controlling means, said bars each adapted to operate said rod-actuating means, substantially as set forth.

25. In a computing and recording machine, the combination of a shaft, a rod supported upon supports journaled upon said shaft, computing mechanism, oscillating means journaled upon said shaft, and connecting means for operatively connecting said oscillating means with said computing mechanism, said rod adapted to actuate said oscillating means, substantially as set forth.

26. In a computing and recording machine, the combination of a shaft, a rod supported upon supports journaled upon said shaft, computing mechanism, a pulley journaled upon said shaft, and connecting means for transmitting motion from said pulley to said computing mechanism, said rod operatively connected with said pulley, substantially as set forth.

27. In a computing and recording machine, the combination of a shaft, an arm and pulley, a rod supported upon said arm and pulley, each of the latter being journaled upon said shaft, computing mechanism, and connecting means for transmitting motion from said pulley to said computing mechanism, said rod operatively connected with said pulley, substantially as set forth.

28. In a computing and recording machine, the combination of a shaft, an arm and pulley, a spring-actuated rod supported upon said arm and pulley, each of the latter journaled upon said shaft, computing mechanism, and connecting means for transmitting motion from said pulley to said computing mechanism, substantially as set forth.

29. In a computing and recording machine, the combination of a shaft, an arm and a spring-actuated pulley, each journaled upon said shaft, a rod supported upon said arm and pulley, computing mechanism, and connecting means for transmitting motion from said pulley to said computing mechanism, substantially as set forth.

30. In a computing and recording machine, the combination of a shaft, an arm and a pulley each journaled upon said shaft, a rod supported by said arm and pulley, computing mechanism, and elastic connecting means for transmitting motion from said pulley to said computing mechanism, substantially as set forth.

31. In a computing and recording machine, the combination of a shaft, an arm and a pulley each journaled upon said shaft, a rod supported upon said arm and pulley, computing mechanism, and connecting means for transmitting motion from said pulley to said computing mechanism said connecting means provided with a spring adapted to actuate said pulley, substantially as set forth.

32. In a computing and recording machine, the combination of a shaft, a rod supported upon supports journaled upon said shaft, computing mechanism, means for transmitting motion from said rod to said computing and recording mechanism, and a plurality of means independent of each other, each adapted to be operated to actuate said rod, substantially as set forth.

33. In a computing and recording machine, a platen mounted at one end and having the other end free, substantially as set forth.

34. In a computing and recording machine, a platen supported at one end only and adapted to be extended at the free end, substantially as set forth.

35. In a computing and recording machine, a platen having one end free, substantially as set forth.

36. In a computing and recording machine, the combination with a platen of a platen-shaft for supporting said platen and mounted at one end only and having a removable portion at said unmounted end, substantially as set forth.

37. In a computing and recording machine, the combination of a platen, a platen-shaft for supporting said platen and supported at one end only, a secondary platen adapted to be secured at the free end of said first-named platen, whereby the length of the platen may be adjusted, substantially as set forth.

In testimony whereof I have signed my name to this specification in the presence of two subscribing witnesses.

JOHN C. McLELAND.

In presence of—
O. E. HODDICK,
GEO. D. WIGHTMAN.